United States Patent [19]
Meijer

[11] Patent Number: 5,531,555
[45] Date of Patent: Jul. 2, 1996

[54] BALE COLLECTOR WITH ROLLERS AND BALER SUITABLE THEREOF

[76] Inventor: Thomas H. D. Meijer, Stadsweg 123, 9792 Re Ten Post, Netherlands

[21] Appl. No.: 509,830

[22] Filed: Aug. 1, 1995

Related U.S. Application Data

[62] Division of Ser. No. 232,728, Apr. 25, 1994.

[30] Foreign Application Priority Data

Apr. 26, 1993 [NL] Netherlands ............................. 9300712

[51] Int. Cl.⁶ .................................................. A01D 85/00
[52] U.S. Cl. .......................... 414/24.5; 414/111; 198/662
[58] Field of Search ................................ 414/24.5, 24.8, 414/111, 910, 911; 198/662, 663

[56] References Cited

U.S. PATENT DOCUMENTS

| | | | |
|---|---|---|---|
| 4,604,018 | 8/1986 | Kruse | 414/111 |
| 4,773,806 | 9/1988 | Beauliev | 414/24.5 |
| 5,295,776 | 3/1994 | Meijer | 414/111 |
| 5,340,259 | 8/1994 | Flaskey | 414/24.5 |
| 5,367,860 | 11/1994 | Cullen | 198/662 |

*Primary Examiner*—Frank E. Werner
*Assistant Examiner*—Gregory A. Morse
*Attorney, Agent, or Firm*—Deveau, Colton & Marquis

[57] ABSTRACT

Bale collector, includes a frame provided with wheels, bale-carrying rollers, coupling element which are suitable for coupling the frame to a mobile baler in order to receive bales onto the carrying rollers from a bale outlet of the baler via a front end—viewed in the direction of travel—of the carrying rollers, and also control mechansim for taking the carrying rollers into a collecting state or into an unloading state, for collecting bales on the carrying rollers or unloading collected bales from the carrying rollers and depositing them on the ground. The carrying rollers have parallel horizontal axes, and the rollers are suitable for collecting a row of two or more bales thereon between the front end and a rear end of the carrying rollers. After initiation of the unloading state, the rollers are driven in order to convey the bales backwards and deposit them on the ground.

4 Claims, 7 Drawing Sheets

BALE COLLECTOR WITH ROLLERS AND BALER SUITABLE THEREOF

This is a divisional of copending application Ser. No. 08/232,728 filed on Apr. 25, 1994.

BACKGROUND OF THE INVENTION

The invention relates to a bale collector comprising a frame provided with wheels, bale-carrying means, coupling means which are suitable for coupling the frame to a mobile baler in order to receive bales onto the carrying means from a bale outlet of the baler by way of a front end, viewed in the direction of travel of the carrying means, and also control means for taking the carrying means into a collecting state or into an unloading state, for collecting bales on the carrying means or unloading bales from the carrying means and depositing them on the ground, the carrying means comprising rollers with parallel horizontal axes, and the rollers being suitable for collecting a row of two or more bales thereon between the front end and a rear end of the carrying means.

A bale collector of this type is known from U.S. Pat. No. 3,010,593. The bale collector known from this document has a relatively high loading platform on which it receives bales from a baler. The bales received fall from the platform onto a conveyor at a lower level. The conveyor comprises two endless conveyor belts next to each other and at the same height, extending at right angles to the direction of travel of the collector and driven stepwise at right angles to the direction of travel, in order to form a row of bales on the belts. After a row of bales has been formed on the conveyor belts, the row is pushed by means of a bar in the opposite direction to the direction of travel onto bale-carrying means with a relatively large surface. The bale-carrying means comprise horizontal rollers, the axes of which extend at right angles to the direction of travel. The rollers are driven stepwise during loading of the bale-carrying means with rows of bales, in such a way that the rows are moved over the rollers in the opposite direction to the direction of travel. As soon as the entire receiving surface of the bale-carrying means and of the conveyor is filled with rows of bales, an unloading mechanism is put into operation, following which all collected bales are deposited on the ground.

A bale collector according to the preamble of claim 1 is also known from WO 9011007. In the case of the bale collector known from this document, the bale-carrying means consist of horizontal rollers, the axes of which run at right angles to the direction of travel. At the rear end of the bale-carrying means there is a blocking roller at a level above them. The blocking roller is provided with a conveyor screw thread. One or more rollers of the carrying means can also be provided with a conveyor screw thread. The rollers are driven in order to convey a bale received from the baler over the rollers of the bale-carrying means until it is against the blocking roller, which bale is then, or possibly simultaneously, moved by the conveyor screw thread of the rollers at right angles to the direction of travel, so that bales supplied one after another form a row of bales at right angles to the direction of travel. On completion of a row, the blocking roller is lowered, in order to convey the row of bales off the bale-carrying means. A part of the bale collector disposed further to the back can receive a number of rows of bales from the front part of the collector on a number of rollers in a horizontal plane with axes at right angles to the direction of travel and against a further blocking means, in particular a bar which can be swung away. After a suitable number of bales has been received, the blocking means of the rear part is swung away, with the result that these rows of bales are conveyed onto the ground.

There are currently balers which can produce bales of large dimensions, for example bales of straw with dimensions of 2.4 m long, 1.2 m wide and 0.7 m high, and having a weight of approximately 400 kg, or bales of silage with dimensions of 1.6 m long, 1.2 m wide and 0.7 m high, and having a weight of approximately 500 to 800 kg. On account of the large dimensions and great weights of such bales, bale collectors by means of which rows of two or more of such bales can be collected in the direction of travel and deposited on the ground essentially without spaces between the bales have not been known until now. It must be observed here that during collection, and possibly while being pushed up by following bales, such heavy bales must be prevented from exerting an unacceptably high counterpressure towards the baler, as a result of which following bales would be pressed too tightly and/or the baler would be too heavily loaded and could be damaged.

SUMMARY OF THE INVENTION

The object of the invention is therefore to provide a bale collector which is capable of collecting successively a row of two or more bales, in particular of the abovementioned large and heavy type, without the above problems occurring.

For the purpose of achieving this object, the invention provides a bale collector, comprising a frame provided with wheels, bale-carrying means, coupling means which are suitable for coupling the frame to a mobile baler in order to receive bales onto the carrying means from a bale outlet of the baler via a front end, viewed in the direction of travel of the carrying means, and also control means for taking the carrying means into a collecting state or into an unloading state, for collecting bales on the carrying means or unloading bales from the carrying means and depositing them on the ground, the carrying means comprising rollers with parallel horizontal axes, and the rollers being suitable for collecting a row of two or more bales thereon between the front end and a rear end of the carrying means, wherein the rollers form a two-part bottom which can be swung downwards, each bottom part being fixed to a corresponding sub-frame which is coupled by way of corresponding rotary means to the frame, while the axes of rotation of the rotary means extend horizontally and parallel to the direction of travel at a distance from each other which is greater than a dimension of the row of bales in a direction at right angles to the direction of travel, and for reaching the unloading state from the collecting state the control means control the rotary means for turning the bottom parts downwards in order to allow the row of bales to go through between the bottom parts and to be deposited on the ground.

The rollers can have axes which run at right angles or parallel to the direction of travel. In the latter case, the rollers have a conveyor screw thread and are driven by the drive means, and are also suitable for collecting and subsequently depositing on the ground cylindrical bales whose axes extend at right angles to the direction of travel.

The invention also provides a mobile baler having, viewed in the direction of travel, from the back a bale outlet and behind the bale outlet coupling means for coupling to coupling means of the bale collector, wherein the coupling means are rotary coupling means with an essentially vertical axis of rotation, and behind the bale outlet there is provided a supply plate, having in the centre thereof an elongated guide element which is disposed upright on the plate and running essentially parallel to the direction of travel of the baler, for the purpose of guiding over it bales coming out of the bale outlet. By this it is still easy to manoeuvre with the combination of baler and relatively long bale collector, and it is ensured that after a manoeuvre a bale partially projecting from the baler still remains essentially in line with the bale collector.

The abovementioned object of the invention is also achieved by means of a bale collector, comprising a frame provided with wheels, bale-carrying means, coupling means which are suitable for coupling the frame to a mobile baler in order to receive bales onto the carrying means from a bale outlet of the baler via a front end—viewed in the direction of travel—of the carrying means, and also control means for taking the carrying means into a collecting state or into an unloading state for collecting bales on the carrying means or unloading bales from the carrying means and depositing collected bales on the ground, the carrying means comprising rollers with parallel horizontal axes, and the rollers being suitable for collecting a row of two or more bales thereon between the front end and a rear end of the carrying means, and drive means being disposed on the frame and coupled to the rollers, which drive means in the collecting state and during the unloading drive the rollers for conveying the bales received backwards, wherein the axes of the rollers run parallel to the direction of travel, the rollers each have a conveyor screw thread, and the drive means drive the rollers in a direction of rotation which is such that a bale carried thereon is pushed backwards by the screw threads.

BRIEF DESCRIPTION OF PREFERRED EMBODIMENTS

Other features and advantages of the invention will emerge from the following description of embodiments of the bale collector and the baler according to the invention with reference to the appended drawings. In the drawings:

FIG. 1 shows in perspective a bale collector according to the invention, coupled behind a partially shown baler;

FIG. 8 shows yet another embodiment of the bale collector according to the invention.

DETAILED DESCRIPTION OF PREFERRED EMBODIMENTS

FIG. 1 shows in perspective a bale collector 1 with a main frame 2, to which wheels 3 are coupled. The main frame 2 has at a front end thereof coupling means (not shown) with an essentially vertical axis of rotation, for coupling the collector 1 behind and to a mobile baler 6 with a bale outlet 7. The normal direction of travel of the baler 6 and the collector 1 during baling and collection is indicated by arrow 8.

A supporting plate or supply plate 9 is disposed on the baler 6 above the abovementioned coupling means. An upright guide element 10 is disposed on the top side of the supply plate 9, in the centre thereof and parallel to the direction of travel 8. The supply plate 9 and the guide element 10 prevent bales coming out of the bale outlet 7 from changing direction during or after manoeuvring of the combination of baler 6 and collector 1.

The bales delivered by the baler 6 are bales which can have large dimensions, for example bales of straw with dimensions of 2.4 m long, 1.2 m wide and 0.7 m high, and having a weight of approximately 400 kg, or bales of silage with dimensions of 1.6 m long, 1.2 m wide and 0.7 m high, and having a weight of approximately 500 to 800 kg.

Along the two sides of the collector 1, and symmetrically relative to bales supplied by the baler 6, two sub-frames 11 are coupled to the main frame 2 by means of rotary means 12 with axes running parallel to each other and parallel to the lengthwise direction (during use, the direction of travel 8). The distance between the axis of rotation of the rotary means 12 of one sub-frame 11 and the axis of rotation of the other sub-frame 11 is greater than the dimensions of the bales at right angles to the axes of rotation (at right angles to the direction of travel 8).

Rollers 13 whose axes of rotation run at right angles to the normal direction of travel 8 are coupled to the bottom part of each sub-frame 11.

Figure 2:
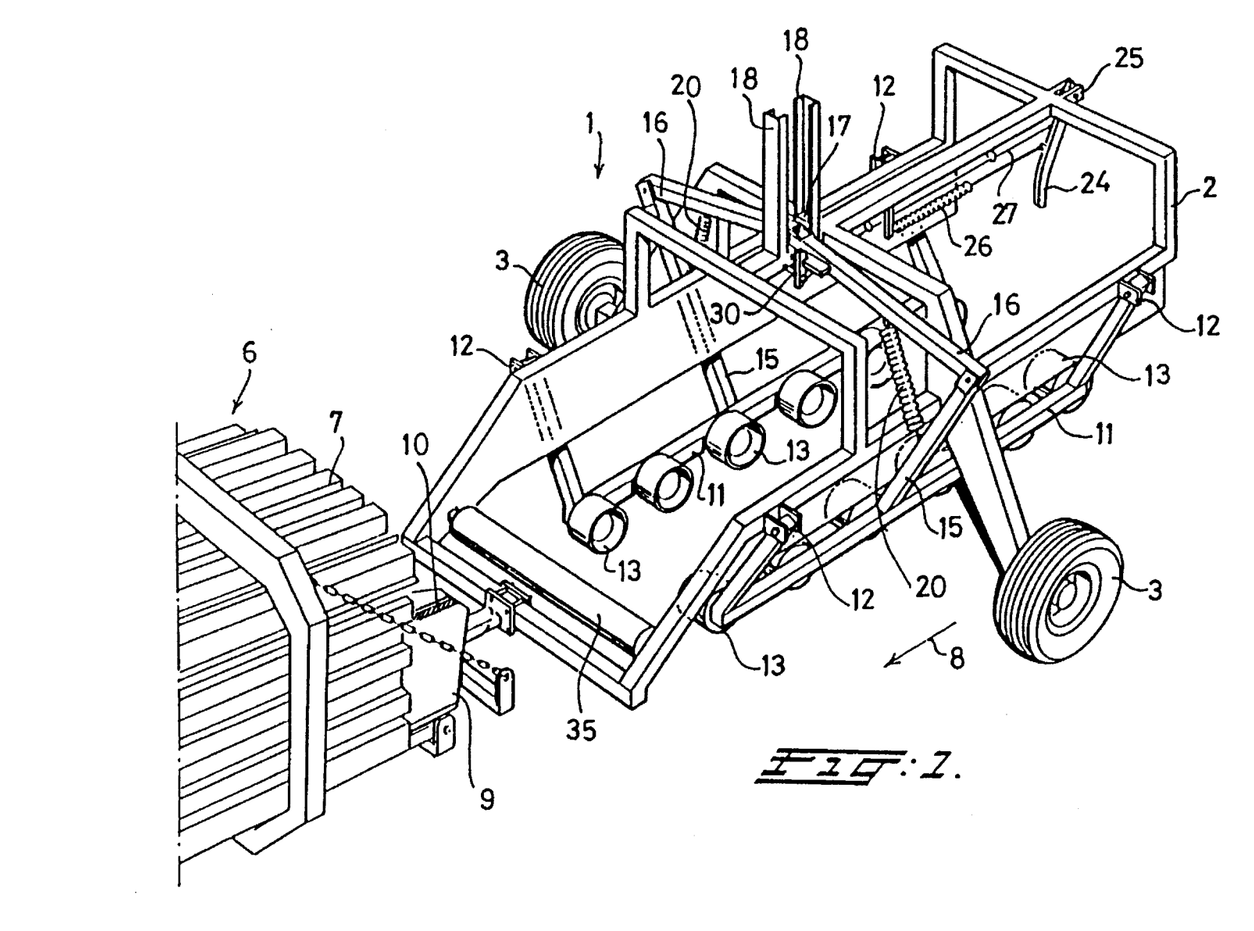
FIG. 2 shows in perspective a part of the synchronizing means of the bale collector of FIG. 1.

An upwardly extending arm 15 is fixed to each sub-frame 11, a top end of which arm is rotatably fixed to an end of a further arm 16. As shown in FIG. 2, the other ends of the arms 16 are rotatable relative to each other and coupled to sliding pieces 17. The axes of rotation of the couplings between the arms 15, 16 are all parallel to the axes of rotation of the rotary means 12 of the sub-frames 11.

The sliding pieces 17 fit into recesses of straight vertical guides 18, which are fixed to the main frame 2.

The sub-frames 11 are forced into the situation shown in FIG. 1 by means of a tension spring 20 between each matching pair of arms 15, 16.

Figure 3:
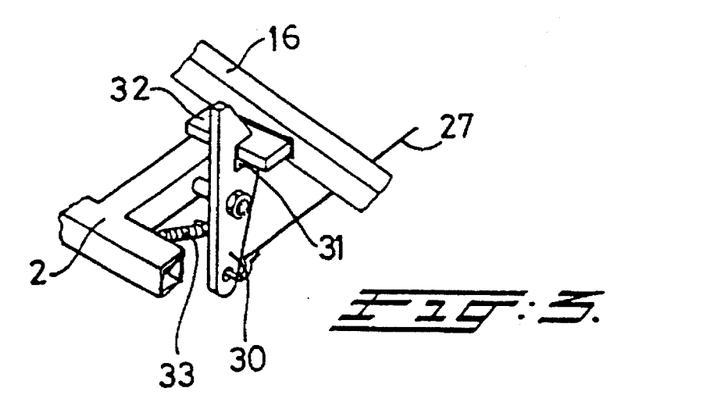
FIG. 3 shows in perspective a part of the locking means of the bale collector of FIG. 1.

A control arm 24 is fitted at the rear side of the collector 1, which arm extends downwards, and the top end of which is coupled by means of a rotary coupling 25 to the main frame 2. The axis of rotation of the coupling 25 runs at right angles to the direction of travel 8. The bottom end of the control arm 24 is at such a low level during the collection that it is lower than the top side of bales collected on the rollers 13. The control arm 24 is forced into the position shown in FIG. 1 by means of a tension spring 26 between the main frame 2 and the control arm 24. Fixed to the control arm 24 is a pulling wire 27, which is also fixed to a locking clamp 30 which, as shown more clearly in FIG. 3, is rotatably fixed to the main frame 2 and at the other end it has a recess 31, which in the collecting position of the collector shown in FIG. 1 accommodates a strip 32, which is fixed to one of the arms 16. The clamp 30 is forced into the position shown in FIGS. 1 and 3 by means of a tension spring 33 (shown only in FIG. 3) between one end of the clamp 30 and the main frame 2.

At the front of the collector 1, an additional supporting roller 35 is disposed between the sides of the collector 1.

During operation of the baler 6, it delivers through the bale outlet 7 bales which are guided first over the supply plate 9 with the guide element 10, and then over the supporting roller 35 and the rollers 13. During movement over the rollers 13, 35 the bales push each other backwards. When a rear bale pushes against the control arm 24, the latter by way of the pulling wire 27 will cause the clamp 30 to turn, with the result that the strip 32 (FIG. 3) is released from the recess 31 of the clamp 30. The axes of rotation of the rotary means 12 are situated at such a distance on either side of the bales 38a, 38b (FIG. 4) to be collected that the weight of the bales 38a, 38b collected on the rollers 13 (FIG. 4) causes the sub-frames 11 to turn away from each other, and the bales 38a, 38b can fall between the rollers 13 onto the ground. Since the sub-frames 11 are coupled by means of the sets of arms 15, 16 and the guide means 17, 18, it is ensured that the sub-frames 11 turn simultaneously, with the result that tilting of the bales 38a, 38b about an axis running parallel to the direction of travel 8, and thus breakdown of the collector 1, are prevented. A row of bales 38a, 38b which has collected on the rollers 13 is deposited relatively quickly. Owing to the fact that the bales have pushed each other up and will be deposited simultaneously on the ground, there will be essentially no spaces between the bales 38a, 38b deposited on the ground, which makes it easier for complete rows to be picked up mechanically thereafter and processed further.

When the bale collector 1 has travelled further, the tension springs 20 ensure that the position of the collector 1 shown in FIG. 1 is resumed.

The rollers 13 can be driven by means of drive means (not shown), in order to make it easier to move backwards bales supplied by the baler 6, for the purpose of counteracting the counterpressure towards the baler 6 which occurs when the bales push each other up.

Figure 4:
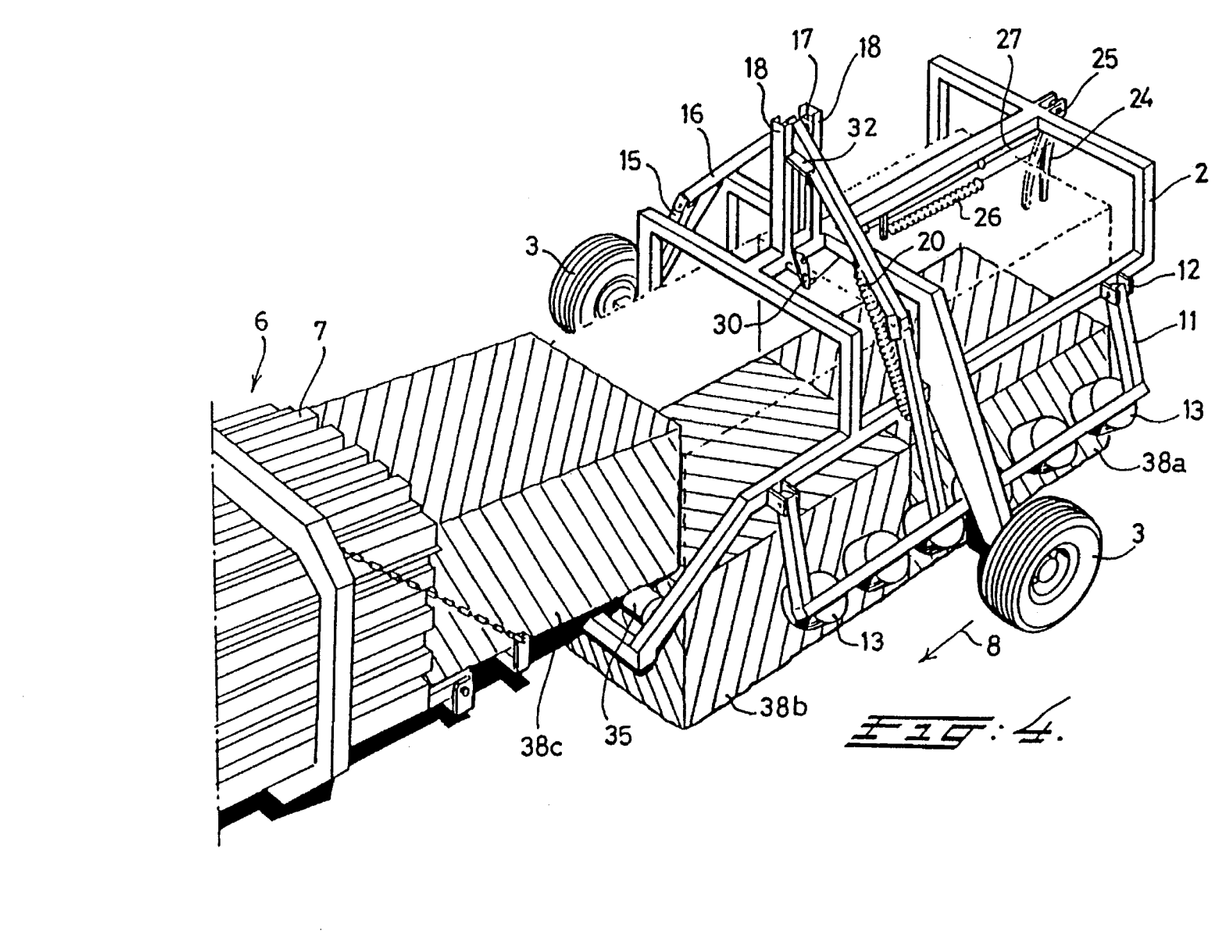
FIG. 4 shows in perspective the bale collector of FIG. 1 in an unloading state.

Although the embodiment of the bale collector 1 according to the invention shown in FIGS. 1 and 4 is illustrated and described for the collection of a row of two bales thereon, the collector is easily made suitable for collecting a row with more bales. This also applies to the other embodiments of the bale collector according to the invention described hereinafter.

Figure 5:
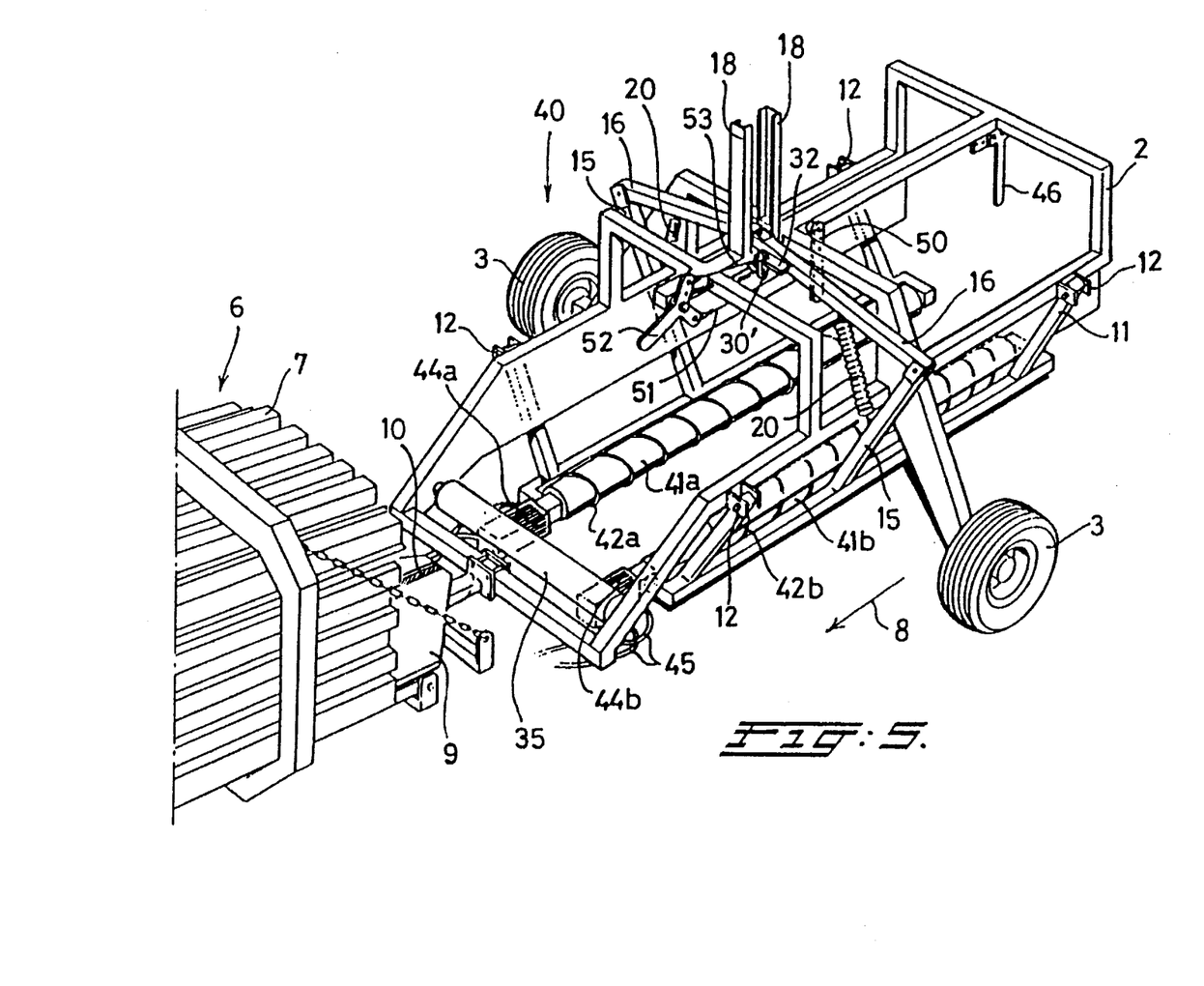
FIG. 5 shows another embodiment of the bale collector according to the invention.
Figure 6:
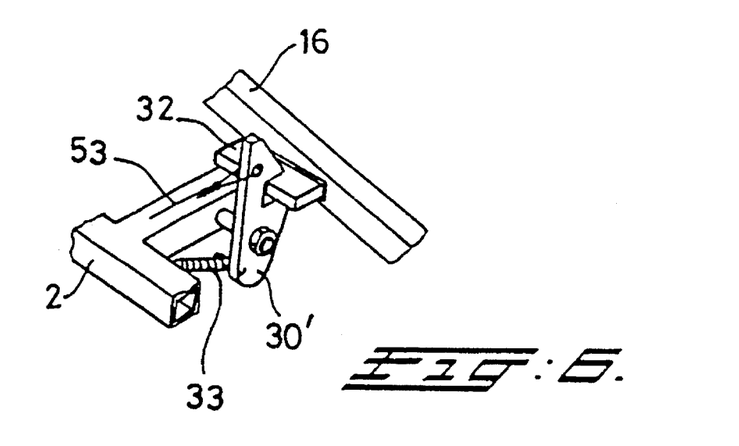
FIG. 6 shows in perspective a part of the locking means of the bale collector of FIG. 5.
Figure 7:
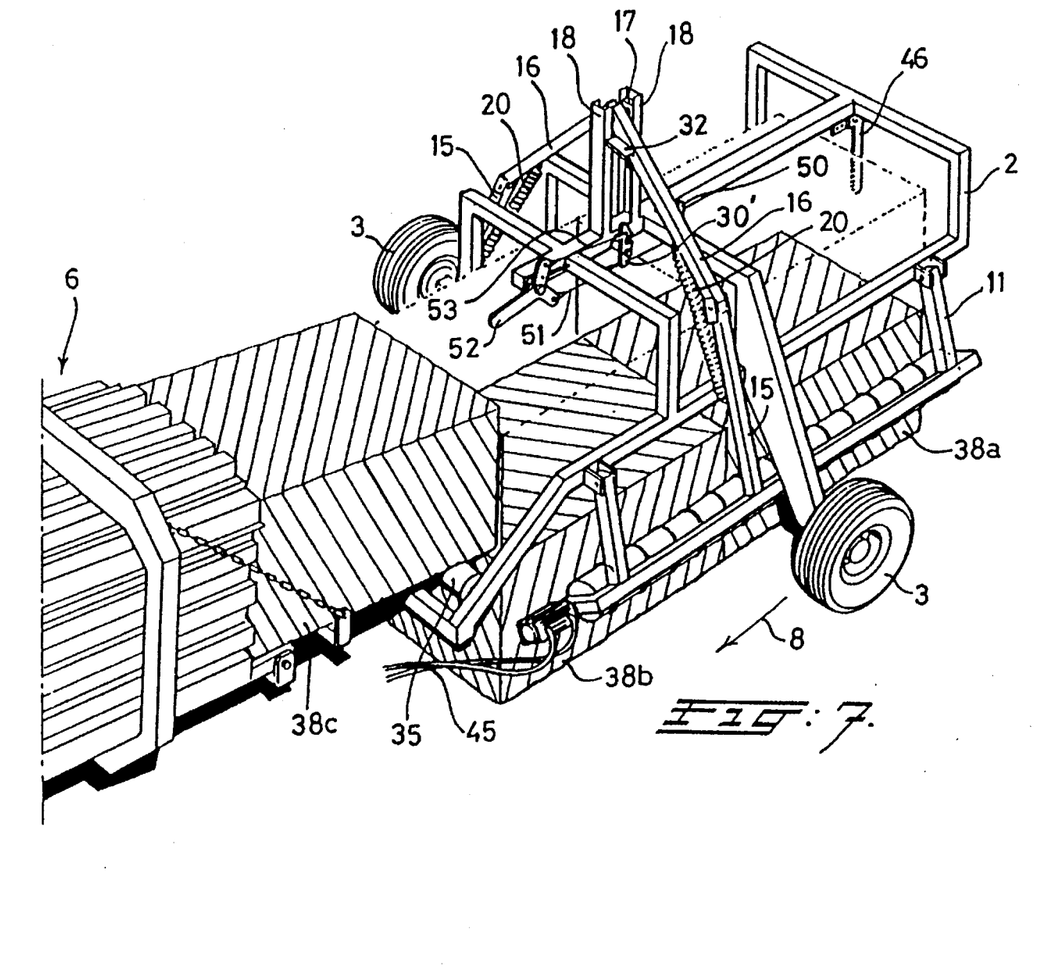
FIG. 7 shows in perspective the bale collector of FIG. 5 in the unloading state.

FIGS. 5 and 7 show in perspective another embodiment of a bale collector 40 according to the invention. The bale collector 40 differs from the bale collector 1 in that the rollers 13 of the bale collector 1 are replaced by long rollers 41a, 41b, each of which is provided with a conveyor screw thread 42a, 42b, and the axes of rotation of which run parallel to the lengthwise direction (normal direction of travel 8) of the collector 40. Each roller 41a, 41b is coupled to a corresponding motor 44a, 44b. The motors 44a, 44b are in particular hydraulic motors which are coupled by way of lines 45 to a drive device (not shown) of the baler 6.

As shown, viewed in the direction of travel 8, the screw thread 42a of the right-hand roller 41a is a right-handed screw thread, and the screw thread 42b of the left-hand roller 41b is a left-handed screw thread. The motors 44a, 44b are driven in such a way that bales delivered by the baler 6 are conveyed backwards by the rollers 41a, 41b. Viewed in the direction of travel 8, the roller 41a will then turn anti-clockwise, and the roller 41b clockwise, which prevents the bales from being pressed against the sides of the collector 40.

The motors 44a, 44b are controlled in such a way that they convey bales on the rollers 41a and 41b at a speed which is preferably at most equal to the speed at which the baler 6 delivers bales.

At the rear side of the collector 40, the rear bale is retained by a retaining element 46, which is fixed to the main frame 2.

The collector 40 has similar locking means to the locking means 30–33 of the collector 1 shown in FIG. 3, but with a clamp 30' to which the wire 27 is not fastened. The collector 40 has at approximately the height of the locking means 30'–33 and further backwards a control arm 50, a top end of which is coupled rotatably to the main frame 2, and to which a wire 51 is fixed at a lower level, another end of which is fixed to a front control arm 52, which is rotatably coupled to the main frame 2, and another end of which is fixed by means of a wire 53 to the top end of the clamp 30'.

When a bale passes the control arm 50, the control arm 50 will rotate (in FIG. 5 anti-clockwise), with the result that the control arm 50 by way of the wire 51 will pull the arm 52 downwards so much that when a subsequent bale passes the control arm 52 the latter will rotate further and, by way of the wire 53, will pull the clamp 30' away from the strip 32, with the result that unloading of bales collected on the rollers 41a, 41b is initiated. The sub-frames in this case will rotate to the position shown in FIG. 7, in order to allow the bales 38a, 38b through between the rollers 41a, 41b and to deposit them on the ground. The control arms 50, 52 and the clamp 30' have in the meantime returned by means of suitable springs to the initial position. When the bale collector 40 has travelled further, the tension springs 20 ensure that the position of the collector 40 shown in FIG. 5 is resumed.

If the collector 40 is of suitable dimensions, it is also suitable for the collection of cylindrical bales with axes running at right angles to the direction of travel 8.

FIG. 8 shows yet another embodiment of a bale collector 60 according to the invention. The bale collector 60 has a frame 61 to which wheels 62 are coupled. The collector 60 is coupled behind a mobile baler 63 by means of coupling means. The normal direction of travel during baling and collection is indicated by arrow 64.

The baler 63 is of a type which is suitable for producing cylindrical bales, the axes of which run at right angles to the direction of travel 64. When a bale has been produced, a rear part 65 of the baler 63 is rotated upwards, with the result that the ready bale can roll out of the baler 63.

The collector 60 has along the sides thereof two rollers 66a, 66b which are parallel to each other and to the normal direction of travel 64, and are at such a height and at such a distance from each other that they can support bales delivered by the baler 63. Viewed in the direction of travel 64, the right-hand roller 66a has a right-handed conveyor screw thread 67a, and the left-hand roller 66b has a left-handed conveyor screw thread 67b. The rollers 66a, 66b are driven by motors 68a, 68b, which are in particular hydraulic motors which are controlled from a drive unit (not shown) of the baler 63. The motors 68a, 68b drive the rollers 66a, 66b in such a way that bales received on the rollers 66a, 66b are transported backwards, and as a result of the opposite screw thread directions, the bales are prevented from being pushed against the side of the collector 60.

Disposed at the rear side of the collector 60 is a retaining element 70, a top end of which is coupled to the frame 61 by means of a horizontal rotary shaft 71 running at right angles to the direction of travel 64. The retaining element 70 is forced into the position shown in FIG. 8 by means of a spring 72, one end of which is fixed to the frame 61. An arm 73 with a crosspiece 74 is fixed to the shaft 71. A rotatable clamp 75 is coupled to the frame 61 opposite the transverse-piece 74. The clamp 75 has a recess 76. In the position of the collector 60 shown in FIG. 8, the crosspiece 74 falls into the recess 76 (FIG. 9) of the clamp 75, so that the retaining element 70 is locked in the position shown.

Further forward, a control arm 80 is rotatably coupled to the frame 61. Still further forward, another control arm 81 is rotatably coupled to the frame 61. A wire 82 is connected between the arms 80 and 81. A wire 83 is connected between the arm 81 and the clamp 75. The control arms 80 and 81 are forced into the position shown in FIG. 8 by means of springs 84, 85, ends of which are fixed to the frame 61.

The design and the arrangement of the control arms 80 and 81 and the fixing of the wires 83 are such that only when a complete row of bales 90a, 90b, 90c has collected on the rollers 66a, 66b does the arm 81 by way of the wire 83 cause the clamp 75 to rotate, with the result that the lock of the retaining element 70 is released, and the bales 90a, 90b, 90c can leave the collector 60 at the rear side as a result of the rollers 66a, 66b being driven.

Figure 9:
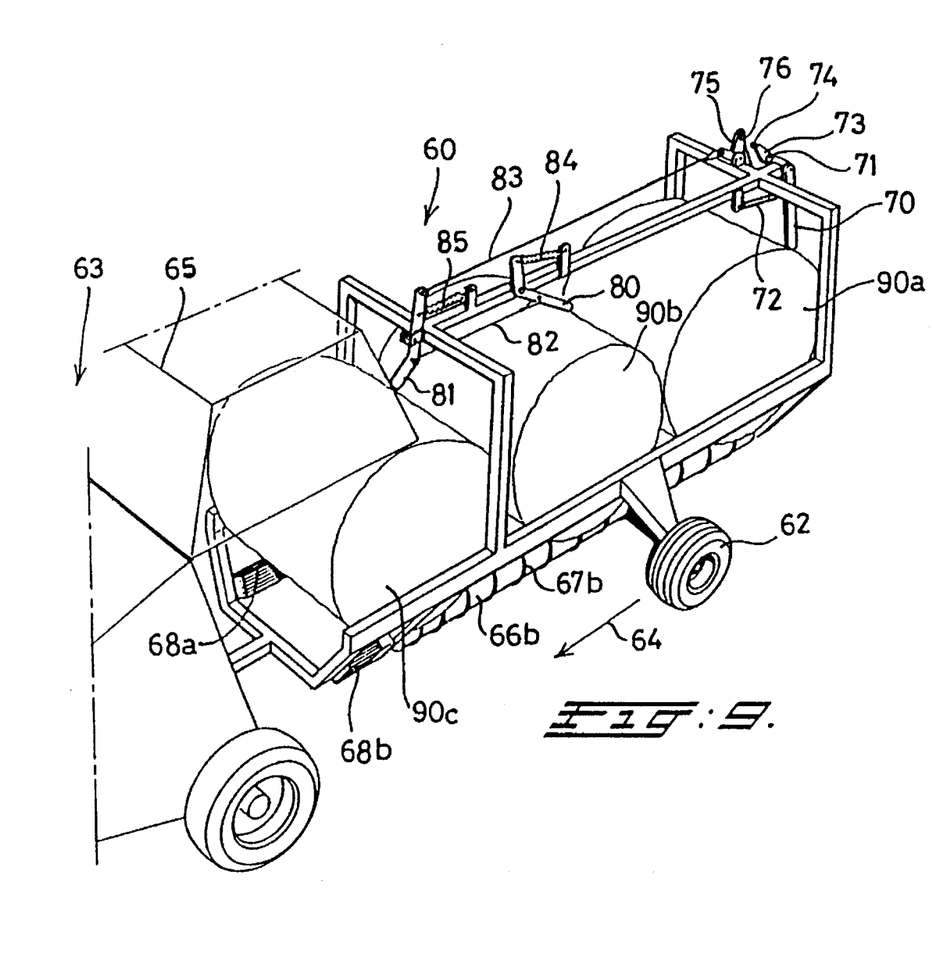
FIG. 9 shows in perspective the bale collector of FIG. 8 with cylindrical bales collected thereon at the time of initiation of the unloading state.

For the embodiment of the bale collector 60 shown in FIGS. 8 and 9, the motors 68a, 68b drive the rollers 66a, 66b, preferably at such a speed that they convey the bales 90a, 90b, 90c at a speed which is at most equal to the speed at which the baler 63 delivers the bales. During the unloading, the motors 68a, 68b can be driven in such a way that the bales 90a, 90b, 90c are unloaded at a greater conveyance speed of the rollers 66a, 66b.

The control means 80–85 and pre-tensioned blocking means and locking means 70–76 of the embodiment of the bale collector shown in FIGS. 8 and 9 can, if desired, be replaced by a single control arm at the rear end of the collector, which arm also acts as a retaining element for retaining bales until the bales, for example, exert a certain pressure on the control arm, with the result that the latter turns away in order to allow the bales to go through and be deposited on the ground.

What is claimed is:

1. Bale collector, comprising a frame provided with wheels for supporting the bale collector as it is moved in a direction of travel, bale-carrying means, and control means for taking the carrying means into a collecting state or into an unloading state for collecting bales on the carrying means or unloading bales from the carrying means and depositing collected bales on the ground, the carrying means comprising rollers with parallel horizontal axes, and the rollers being suitable for collecting a row of two or more bales thereon between a front end and a rear end of the carrying means, and drive means being disposed on the frame and coupled to the rollers, which drive means in the collecting state and during the unloading state drive the rollers for conveying the bales received backwards, wherein the axes of the rollers run parallel to the direction of travel, the rollers each have a conveyor screw thread, and the drive means drive the rollers in a direction of rotation which is such that a bale carried thereon is pushed backwards by the screw threads.

2. Bale collector according to claim 1, wherein at the rear end of the carrying means pre-tensioned movable blocking means are provided, for the purpose of retaining in the collecting position a rear bale conveyed against them, the control means at the rear end of the carrying means have a control arm, and the control means between the frame and the blocking means have locking means, in such a way that in the collecting state when the control arm is moved by a rear bale the locking means release the movement of the blocking means, in order to initiate the unloading state.

3. Bale collector according to claim 1, wherein the control means have detector means which detect the bales collected on the rollers, and on detection of a complete row the control means control the locking means, for the purpose of releasing the blocking means, in order to initiate the unloading state.

4. Bale collector according to claim 1, wherein in the collecting state a conveyance speed imparted to the bales by the drive means is lower than or equal to a supply speed of the bales from the baler.

* * * * *